US00RE34059E

United States Patent [19]

Akitake

[11] E Patent Number: Re. 34,059

[45] Reissued Date of Patent: Sep. 8, 1992

[54] ZOOMING MECHANISM FOR ZOOM LENS

[75] Inventor: Hiroshi Akitake, Hachioji, Japan

[73] Assignee: Olympus Optical Company, Ltd., Japan

[21] Appl. No.: 730,109

[22] Filed: Jul. 15, 1991

Related U.S. Patent Documents

Reissue of:

[64] Patent No.: 4,948,235
Issued: Aug. 14, 1990
Appl. No.: 218,701
Filed: Jul. 13, 1988

[30] Foreign Application Priority Data

Jul. 13, 1987 [JP] Japan ..... 62-175306
Jul. 16, 1987 [JP] Japan ..... 62-177784

[51] Int. Cl.[5] ..... G02B 15/00

[52] U.S. Cl. ..... 359/700; 359/706; 359/826

[58] Field of Search ..... 359/691, 826, 693, 825, 359/694, 695, 696, 697, 698, 699, 700, 701, 704, 705, 706; 354/195.1, 195.11

[56] References Cited

U.S. PATENT DOCUMENTS

| | | | |
|---|---|---|---|
| 2,746,350 | 5/1956 | Hopkins | 359/694 |
| 3,251,285 | 5/1966 | Uterhart | 354/195.1 |
| 3,445,155 | 5/1969 | Sturrock | 359/699 |
| 3,587,431 | 6/1971 | Holler | 359/705 |
| 3,765,748 | 10/1973 | Mito | 359/701 |
| 3,765,751 | 10/1973 | Noguchi | 359/700 |
| 3,851,952 | 12/1974 | Werz et al. | 359/706 |
| 4,078,857 | 3/1978 | Kantner et al. | 359/705 |
| 4,203,651 | 5/1980 | Persson | 359/706 |
| 4,275,952 | 6/1981 | Uesugi | 359/701 |
| 4,318,593 | 3/1982 | Tsuji et al. | 359/706 |
| 4,389,098 | 6/1983 | Fukushima | 359/704 |
| 4,583,827 | 4/1986 | Tokunaga et al. | 359/696 |

FOREIGN PATENT DOCUMENTS 118816 6/1985 Japan .

*Primary Examiner*—Loha Ben
*Attorney, Agent, or Firm*—Louis Weinstein

[57] ABSTRACT

A zooming mechanism for a zoom lens comprises a zooming frame disposed for translation back and forth with respect to a stationary member in the direction of an optical axis and carrying a focus lens group in a manner to permit its focus adjustment; a drive for translating the zooming frame in the direction of the optical axis, a carrier frame for carrying another zoom lens group and supported within the zooming frame by a support member located therein for translation back and forth in the direction of the optical axis, a device for deriving a rotational drive in association with the translation of the zooming frame in the direction of the optical axis, and a device responsive to the rotational drive to cause a non-linear movement of the carrier frame. A rotational drive is derived in association with the translation of the zooming frame in the direction of the optical axis, and utilized by said non-linear moving device to cause a non-linear movement of the carrier frame to achieve a zooming operation.

41 Claims, 11 Drawing Sheets

ZOOMING MECHANISM FOR ZOOM LENS

Matter enclosed in heavy brackets [ ] appears in the original patent but forms no part of this reissue specification; matter printed in italics indicates the additions made by reissue.

FIELD OF THE INVENTION AND RELATED ART STATEMENT

The invention relates to a zooming mechanism for *a* zoom lens, in particular, to a zooming mechanism for a zoom lens as may be used in a still camera or video camera.

A conventional zoom lens includes two or three movable lens groups, and includes a zooming mechanism which moves such movable lens groups back and forth in the direction of an optical axis. As is well recognized, almost all of such mechanisms employ an arrangement to translate a lens barrel by utilizing a cam mechanism including a cam groove and a drive pin or pins fitted in the cam groove.

Specifically, FIGS. 13A, 13B, 14 and 15 illustrate an example of a typical zooming mechanism used in the prior art. A first lens barrel 1 carries a first lens group $L_1$, and a second lens barrel 2 carries a second lens group $L_2$. These lens barrels are disposed one after another in the direction of an optical axis 0. The lens barrels have holders 1a, 1b and 2a, 2b which extend upward and downward therefrom and through which openings 1c, 1d and 2c, 2d are formed. A pair of guide shafts 3, 4 which are disposed to extend in parallel relationship with the optical axis on opposite sides thereof serve as rotational stops, and these guide shafts are tightly, but slidably fitted into the openings 1c, 1d, 2c, 2d to enable the respective lens groups $L_1$, $L_2$ to be translated therealong. Drive pins 5a, 5b, 6a and 6b fixedly mounted on the holders 1a, 1b, 2a and 2b, respectively, fit in cam slots 7a, 7b formed in a cam sleeve 7 to define a zooming mechanism. As indicated by a developed view shown in FIG. 15, the cam slot 7a in which the drive pins 5a, 5b are fitted is a linear skewed slot which has a pitch angle of $\alpha_1$ with respect to the circumferential direction while the cam slot 7b in which the drive pins 6a, 6b are fitted is a curved slot having a pitch angle of $\alpha_2$ with respect to the circumferential direction.

With the zooming mechanism mentioned above, the cam sleeve 7 may be turned to move the first lens barrel 1 and the second lens barrel 2 back and forth in the direction of the optical axis from its wide angle position shown in FIG. 13A to its telescoping position shown in FIG. 13B or vice versa through the engagement between the cam slots 7a, 7b and the drive pins 5a, 5b and 6a, 6b, respectively, thus achieving a zooming action.

However, a conventional zooming mechanism as described above utilizes guide shafts and a cam sleeve disposed outside the lenses, whereby the cam sleeve exhibits an increased diameter. This produces an undesirable, unused space as illustrated by a hatched area in FIG. 14 as compared with the size of a picture frame 8, standing in the way to a miniaturization of a camera. To assure a smooth movement of the lens barrels, a plurality of cam slots are duplicated in a cam sleeve at an equal angular interval, requiring a complicated machining operation [to increase] *which increases* its cost. In addition, the first lens group $L_1$ has a greater travel relative to a travel of the second lens group $L_2$, whereby the pitch angle $\alpha_2$ of the cam slot as shown in FIG. 15 increases, requiring a greater force to operate during the zooming operation, which is disadvantageous.

OBJECT AND SUMMARY OF THE INVENTION

It is an object of the invention to provide a zooming mechanism for zoom lens which is compact, which can be manufactured at a reduced cost and which requires less force to drive, thereby eliminating the described disadvantages of the prior art.

In accordance with the invention, a cam sleeve of an increased diameter as used in a conventional zooming mechanism is eliminated. Accordingly, the zooming mechanism of the invention has remarkable features that (1) it is compact and requires a reduced number of parts, and *is* simple in arrangement to achieve a higher accuracy; that (2) the simple construction requiring a reduced number of parts enables the manufacturing cost to be reduced; and that (3) a second zoom lens group *has* reduced lift, thus requiring less force to drive it. In this manner, disadvantages of conventional zooming mechanism are overcome in a sophisticated manner.

DETAILED DESCRIPTION OF PREFERRED EMBODIMENTS

Figure 1:
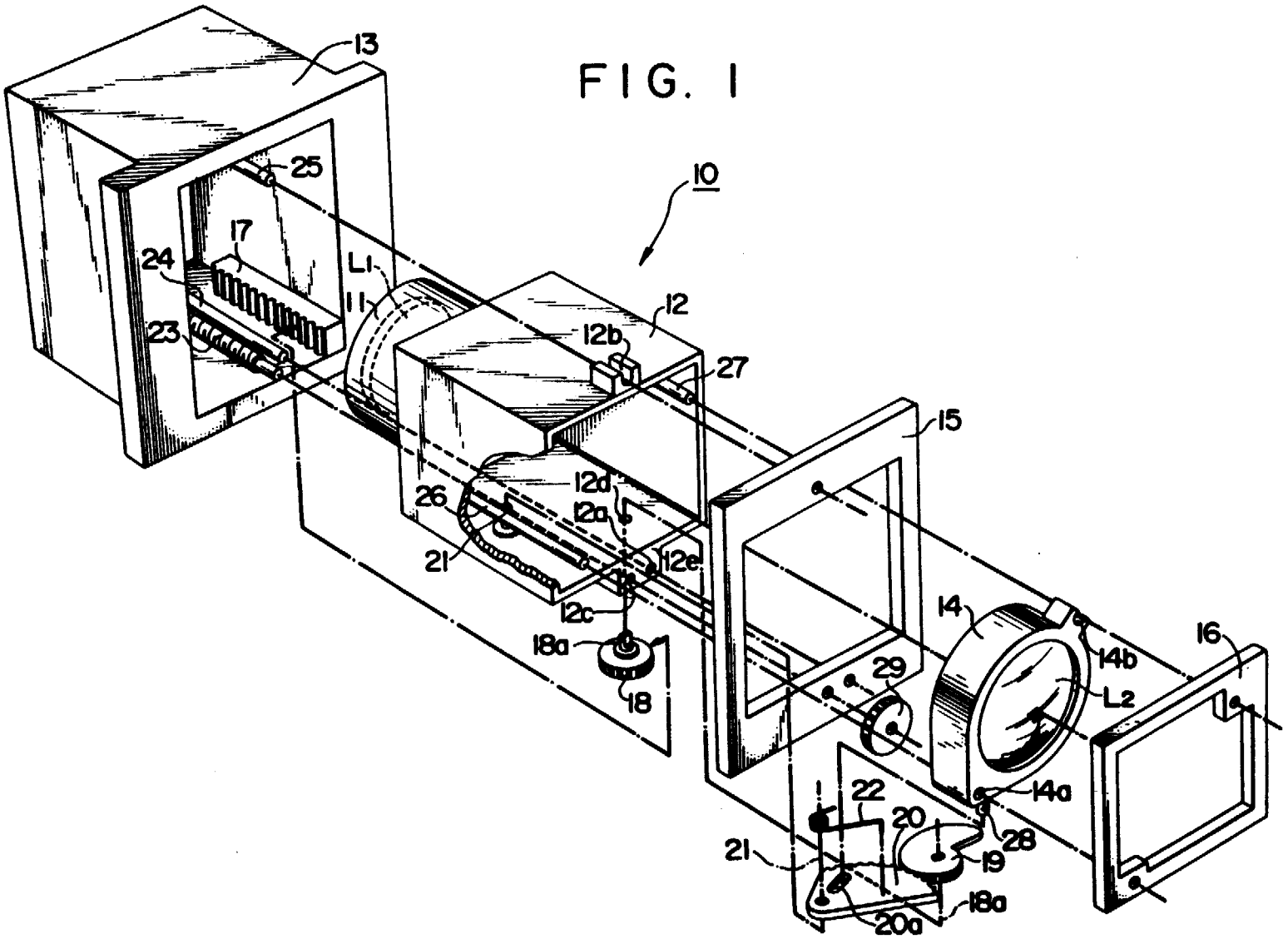
FIG. 1 is an exploded, perspective view of essential parts of a zooming mechanism for a zoom lens according to a first embodiment of the invention.

FIG. 1 is an exploded, perspective view of essential parts of a zooming mechanism for a zoom lens according to a first embodiment of the invention. Specifically, a zooming mechanism 10 comprises two groups of zoom lenses. Specifically, the zooming mechanism 10 shown is arranged as consisting of two groups of zoom lenses, and essentially comprises a zooming frame 12 including a helicoidal screw to support a focus frame 11 which carries a focus lens group $L_1$ in a manner to permit a focusing adjustment and disposed for movement in the direction of an optical axis with respect to a stationary frame 13; a feed screw 23 rotatably mounted in the stationary frame 13 for driving the zooming frame 12 in the direction of the optical axis within the stationary frame 13 when it is driven for rotation; a carrier frame 14 for another zoom lens group $L_2$ mounted on a pair of support shafts 26, 27 which are disposed within the zooming frame 12 so as to extend in parallel relationship with the optical axis for movement back and forth in the direction of the optical axis *and* within the zooming frame 12; a pinion gear 18 rotatably mounted on the lower surface of the bottom wall of the zooming frame 12 for meshing engagement with a rack 17 disposed on the bottom wall of the stationary frame 13 along its right corner and extending in a direction parallel to the optical [axis and] *axis, gear 18 being* rotatable in a plane parallel to the bottom surface; a first non-circular gear 19 integrally and coaxially mounted with the pinion gear 18 on the bottom surface of the zooming frame 12; and a second non-circular gear 20 disposed for meshing engagement with the first non-circular gear for rotation, and having an elongate slot 20a therein which serves to provide a translation of the carrier frame 14 in the direction of the optical axis.

The zooming frame 12 comprises a rectangular hollow body which is displaceably fitted inside the stationary frame 13 which also comprises a rectangular hollow body of a greater size. A pair of support shafts 24, 25 extend between a front wall and a rear frame 15 of the stationary frame 13 in parallel relationship with the optical axis, and extend through a guide opening 12a formed in a block 12e secured to the lower surface of the zooming frame 12 and through a guide groove 12b formed in a projection on the top wall of the zooming frame 12, thus holding the guiding frame against rotation while allowing its translation in a back-and-forth direction.

The carrier frame 14 for another zoom lens group has an ear in its left, lower portion in which a guide opening 14a is formed and another ear in its right, upper portion in which a guide groove 14b is formed. The pair of support shafts 26, 27 extend between the front wall of the zooming frame 12 and the rear frame 16 in parallel relationship with the optical axis, and extend through the guide opening 14a and the guide groove 14b, respectively, thus holding the carrier frame 14 against rotation while supporting it in a translatable manner back and forth in the direction of the optical axis.

The feed screw 23 is rotatably carried by the front wall of the stationary frame 13 and the rear frame 15 and extends in parallel relationship with the optical axis, and engages female threads 12c formed in the block 12e secured to the bottom wall of the zooming frame 12 and extending in a direction parallel to the optical axis. A portion of the feed screw 23 extends rearwardly beyond the rear frame 15 and has a transmission gear 29 integrally mounted thereon, which serves for transmitting rotating power to the feed screw 23.

The pinion gear 18 which meshes with the rack 17 is mounted on a support shaft 18a which rotatably extends through an opening 12d formed in the bottom of the zooming frame 12, and the first non-circular gear 19 is integrally and fixedly mounted on the same shaft while the second non-circular gear 20 which meshes with the first noncircular gear 19 is rotatably carried by a support shaft 21 which is fixedly mounted on the bottom surface of the zooming frame 12. The slot 20a which is elongate in the transverse direction is formed adjacent to the shaft 21 and extends toward the outer periphery. A drive pin 28 fixedly mounted on the bottom of the carrier frame 14 at its left, lower ear is fitted into the elongate slot 20a. The second non-circular gear 20 is urged to rotate clock-wise by a torsion spring 22 which has its one end secured to a stationary point and disposed around the shaft 21 and having its other end extending through the gear 20 adjacent to its one lateral edge, but the resulting rotation is normally suppressed by meshing engagement with the first non-circular gear 19.

Figure 2A:
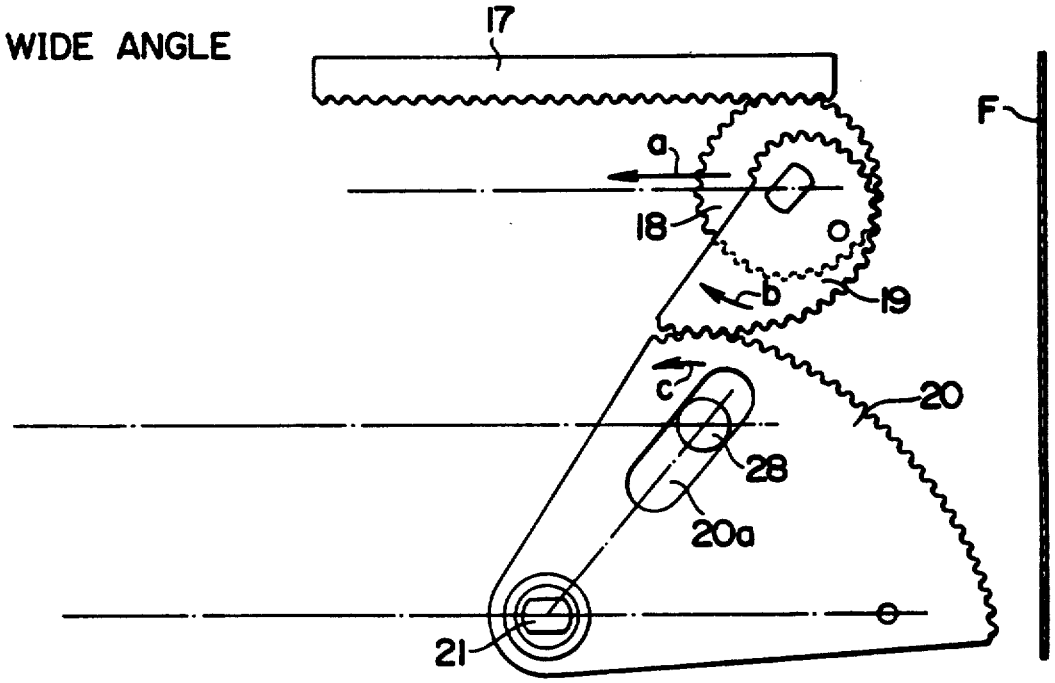
FIGS. 2A and 2B are plan views, to an enlarged scale, specifically illustrating the manner of operation of a first and a second non-circular gear used in the zooming mechanism shown in FIG. 1.
Figure 2B:
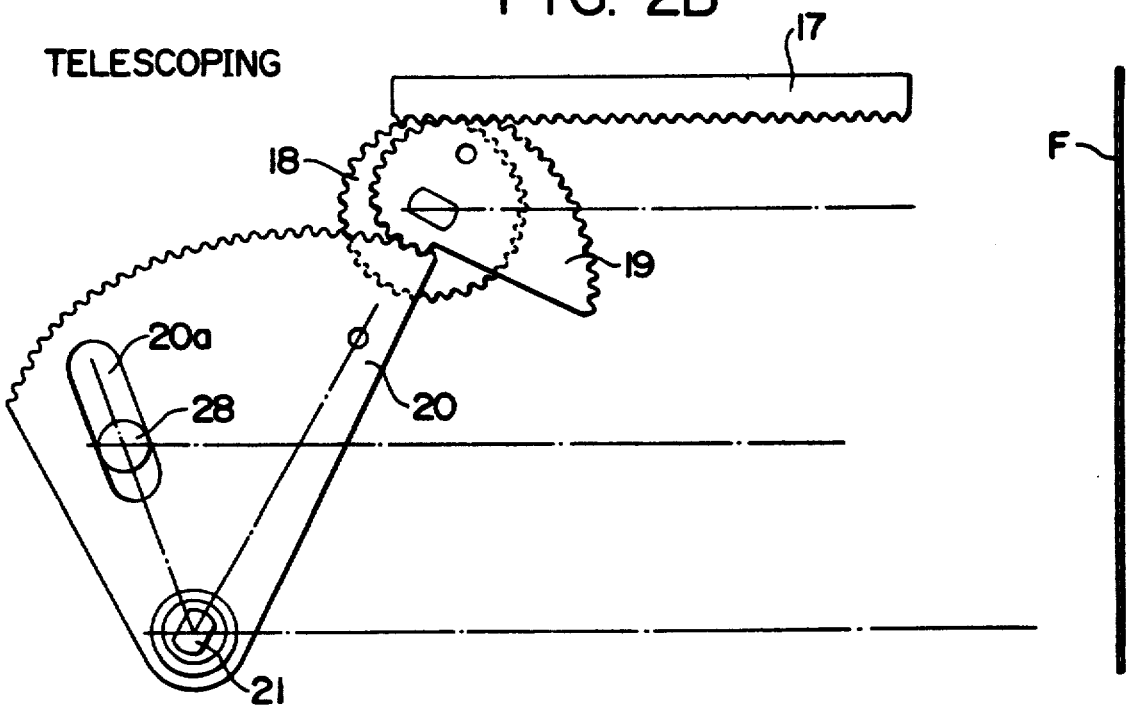
Figure 3:
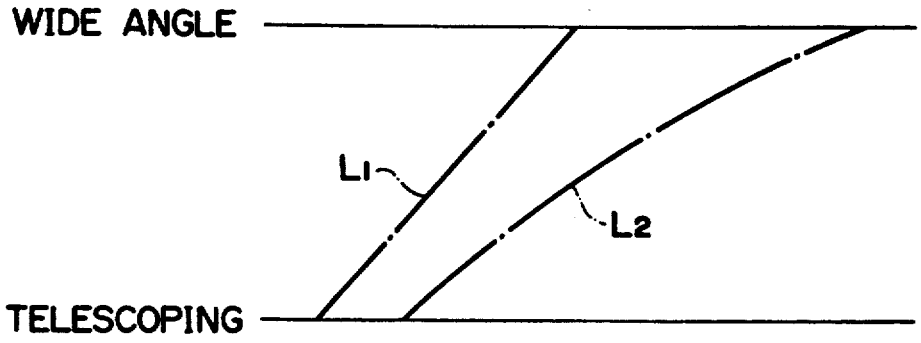
FIG. 3 diagrammatically illustrates loci of movement of a focus lens group and another lens group used in the zooming mechanism shown in FIG. 1.

The operation of the zooming mechanism when zooming from the wide angle side to the telescoping side will be described with reference to FIGS. 2A and 2B. Initially, the pinion gear 18, the first non-circular gear 19 which is coaxial and integral with the gear 18, and the second non-circular gear 20 which meshes with the first gear 19 assume respective positions shown in FIG. 2A when they are located at the wide angle side. As the feed screw 23 is driven by a drive source, not shown, such as a motor or by a manual drive, through the transmission gear 29 to translate the zooming frame [2] *12* (see FIG. 1) in the forward direction, the pinion gear 18 meshing with the rack 17 rotates clockwise as indicated by an arrow b while moving in a *linear* direction indicated by an arrow a in FIG. 2A. This causes the first non-circular gear 19 which is integral therewith to rotate in the same direction, whereby its meshing second gear 20 rotates counter-clockwise as indicated by an arrow c. When the zooming frame 12 is driven forward to its telescoping position, the described members assume respective positions illustrated in FIG. 2B. As a result of such rotation of the second non-circular gear 20, the drive pin 28 associated with the carrier frame 14 which is fitted into the elongate slot 20a formed in the gear 20 moves in a non-linear manner with respect to the focus lens group $L_1$ which moves linearly, as the zooming frame is moved forward, as indicated by the diagram of FIG. 3, thus achieving a smooth zooming operation. It should be understood that the configurations of the first and the second non-circular [gear] *gears* 19, 20 are precisely designed and formed based on optical parameters of the zoom lens, achieving a movement of the lens group $L_2$ as designed[. into a camera, as viewed from the rear side thereof].

It will be appreciated that when zooming from the telescoping to the side angle side, the feed screw 23 is driven for rotation in he reverse direction, performing a similar operation as described above although opposite in direction.

Figure 4:
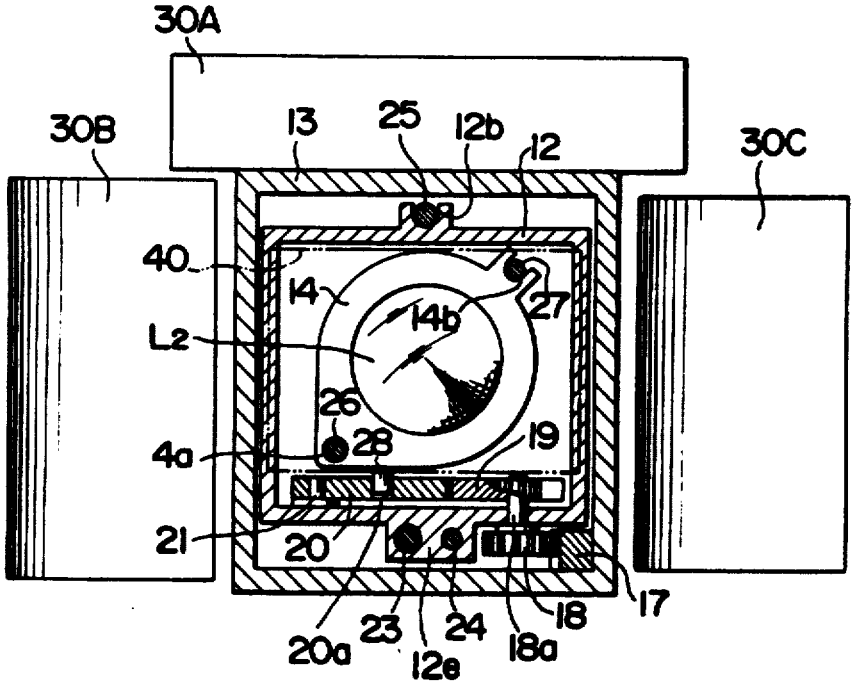
FIG. 4 is a rear view, partly in section, of a portion of the zooming mechanism shown in FIG. 1.

As a result of utilizing non-circular gears in achieving a zooming operation in the zooming mechanism of the first embodiment, it will be noted in FIG. 4 that a viewfinder 30A, a patrone chamber 30B and a spool chamber 30C can be designed so as to be disposed close to a picture frame 40, allowing a substantial reduction in the size of the entire camera. In addition, a complicated and expensive machining of cam slots in a cam sleeve is avoided, allowing a substantial reduction in the manufacturing cost. The movement of the zoom lens group $L_2$ need only be a compensation for the movement of the focus lens group $L_1$, and accordingly, a support mechanism associated therewith can be compact and simple, requiring a reduced magnitude of force to operate the camera.

In the first embodiment described above, the feed screw has been employed to drive the zooming frame. However, it should be understood that the drive mechanism associated with the zooming frame is not limited to the use of the feed screw, but any other drive mechanism such as helicoidal screw may be employed which is capable of [driving] *providing* a translational movement. Where three or more lens groups are used, such mechanisms can be used in a suitable combination. Character F shown in FIGS. 2A and 2B indicate a film plane.

Figure 5:
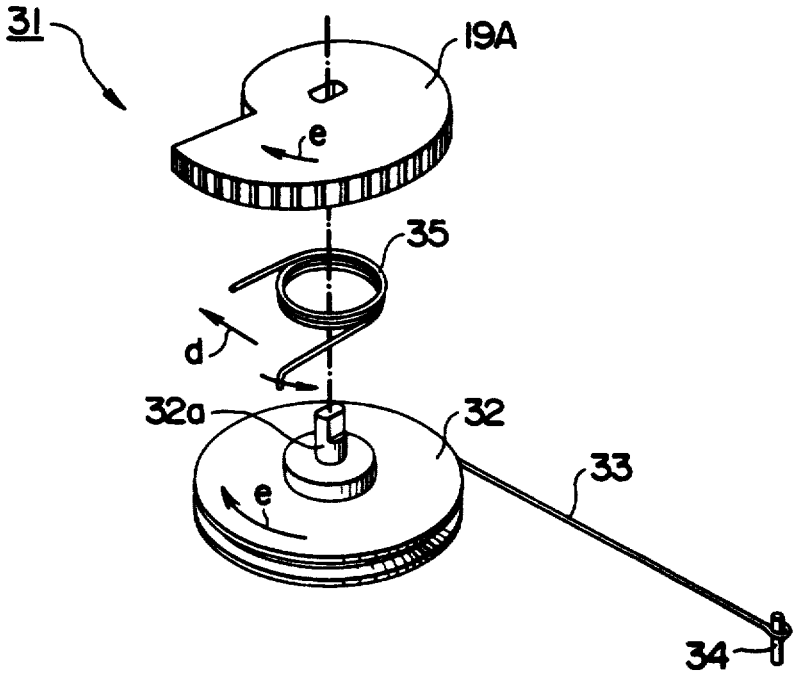
FIG. 5 is an exploded, perspective view of essential parts of another form of drive mechanism which is used to translate a carrier frame carrying another zoom lens group used in the zooming mechanism of the invention.

FIG. 5 shows another form of drive mechanism for moving the carrier frame for another lens group which can be used in a zooming mechanism of the invention. Specifically, a drive mechanism 31 uses a combination of a pulley 32 and a cord 33 in substitution for the combination of the rack 17 and the pinion gear 18 shown in FIG. 1. In other respects, the arrangement is quite similar to the zooming frame of FIG. 1 and operates in a similar manner as before.

The pulley 32 is disposed on the bottom side of the zooming frame 12 at substantially the same position as assumed by the pinion gear 18 shown in FIG. 1, and a support shaft 32a which projects through the bottom integrally and coaxially carries a non-circular gear 19A which is similar to the first non-circular gear 19 shown in FIG. 1. A cord 33 having its one end anchored to a pin 34 fixedly mounted on the bottom of the stationary frame 13 (see FIG. 1) and its other end anchored to the pulley 32 is disposed around this pulley, which is urged for counter-clockwise rotation or in a direction to take up the cord 33, by a torsion spring 35 having its one end disposed in abutment against a stationary point and its other end secured to the upper surface of the pulley 32.

The drive mechanism 31 operates as follows: Specifically when the zooming frame 12 (see FIG. 1) moves in a direction indicated by an arrow d within the stationary frame 13, the pulley 32 moves in the same direction while rotating clockwise or in a direction indicated by an arrow e. The first non-circular gear 19A which is integral with the pulley 32 rotates in the same direction, whereby the second non-circular gear 20 (see FIG. 1) which meshes with the first non-circular gear 19A rotates counter-clockwise, thus operating in a similar manner and achieving an effect similar to the zooming mechanism shown in FIG. 1. The substitution of the pulley 32 and the cord 33 for the combination of the rack 17 and the pinion gear 18 (see FIG. 1) simplifies the construction, reduces the space requirement and allows a reduction in the manufacturing cost.

Figure 6:
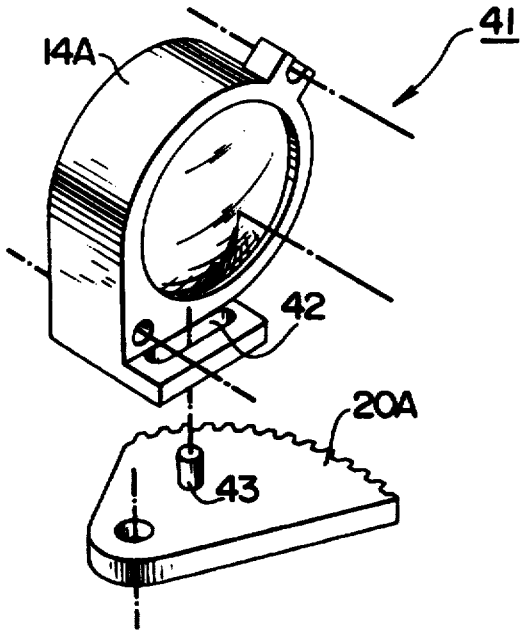
FIG. 6 is an exploded, perspective view of a further form of drive mechanism.

FIG. 6 shows another form of drive mechanism which translates the carrier frame for another zoom lens group which may be used in the zooming mechanism of the invention. Specifically, a drive mechanism 41 is constructed in a manner similar to the zooming mechanism shown in FIG. 1 except for the construction of the carrier frame 14 for another lens group and of the second non-circular gear 20. In other respects, the arrangement is quite similar to the arrangement of FIG. 1, and operates in a similar manner.

In the drive mechanism 41, a carrier frame 14A for another lens group has a bottom wall which extends rearwardly with an elongate slot 42 formed in the extension and extending in a direction substantially perpendicular to the direction of the optical axis. Fitted into the slot 42 is a drive pin 43 fixedly mounted on the upper surface of a second non-circular gear 20A which is similar to the second non-circular 20 shown in FIG. 1.

It will be appreciated that the operation of the drive mechanism 41 is similar to that of the drive mechanism shown in FIG. 1 except that the drive pin 43 and the slot 42 in which the pin is fitted are disposed on the second non-circular gear 20A and the carrier frame 14A, respectively, in a manner opposite from the drive mechanism of FIG. 1. However, the operation remains the same. This arrangement may be advantageous in facilitating the movement depending on the manner of translation of the carrier frame 14A.

Figure 7:
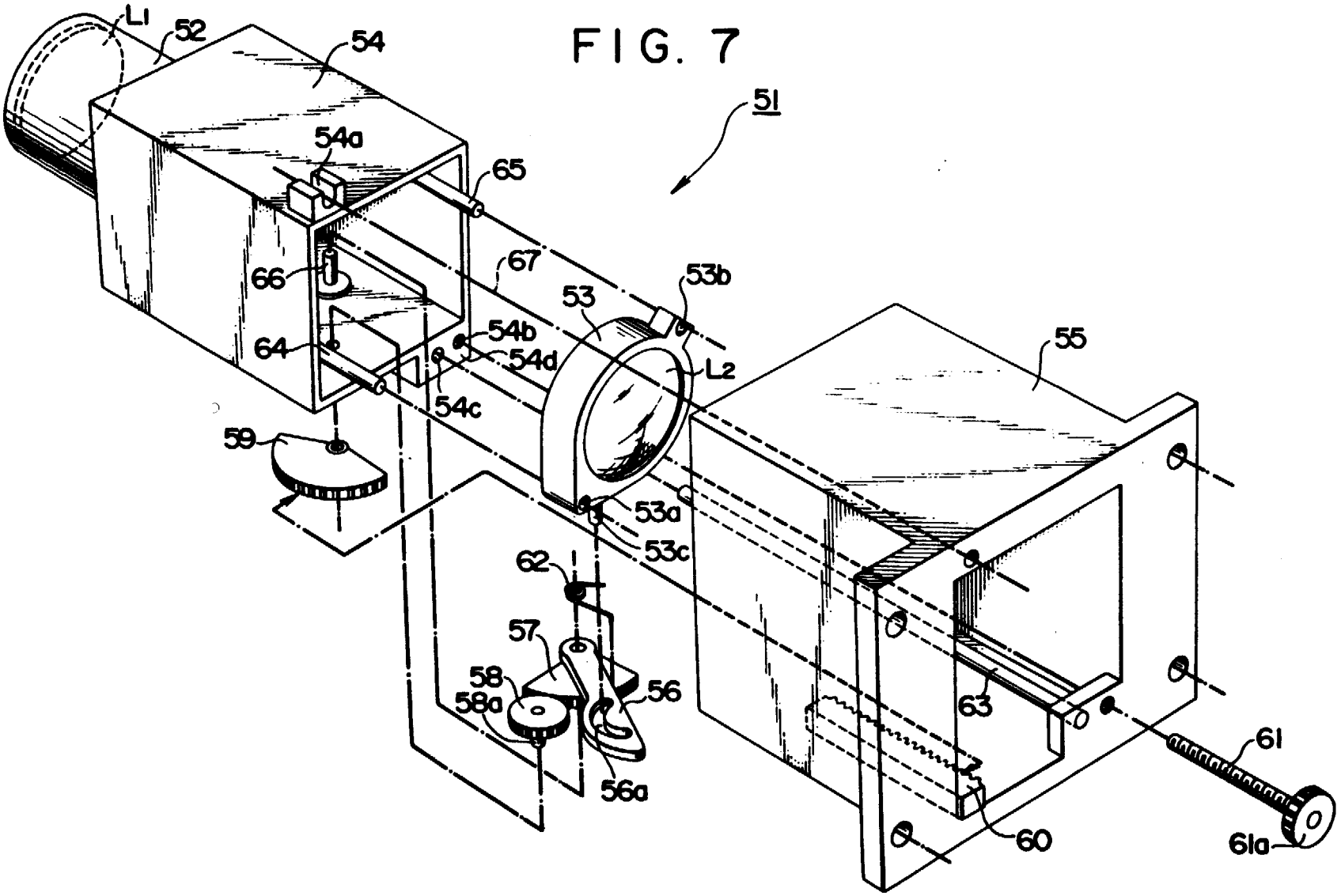
FIG. 7 is an exploded, perspective view of a zooming mechanism for zoom lens according to a second embodiment of the invention.

FIG. 7 is an exploded perspective view of a zooming frame for zoom lens according to a second embodiment of the invention. Specifically, a zooming mechanism 51 comprises two groups of zoom lenses, and essentially comprises a stationary frame 55, a zooming frame 54 which is slidably fitted into the frame 55 and is capable of translating only in the direction of an optical axis, a carrier frame 52 for a focus lens group $L_1$ which is disposed forwardly in the zooming frame 54 in a manner to permit a focusing adjustment, a carrier frame 53 for another zoom lens group which is mounted within the zooming frame 54 to permit its movement back and forth along the optical axis, means for deriving a rotating drive in association with the translation of the zooming frame 54 in the direction of the optical axis, and an actuator cam 56 responsive to the last mentioned means to cause the carrier frame 53 to translate in the direction of the optical axis.

The zooming frame 54 comprises a rectangular hollow body having an open rear side, and the carrier frame 52 for a focus lens group $L_1$ is supported in a forward portion thereof as by a helicoidal screw in a manner to permit a focusing adjustment. The stationary frame 55 *similar to frame 13* again comprises a rectangular hollow body of a greater size than the zooming frame 54, which is slidably fitted inside the stationary frame 55. A feed screw 61 extends through a rear wall of the stationary frame 55 at a location toward the bottom and offset to one lateral side and threadably engages a threaded female feed bore 54b formed in a block 54d which is secured to or forms a lower portion of the zooming frame 54. A rotation transmitting gear 61a is secured to the other end of the feed screw 61, and may be turned to translate the zooming frame 54 relative to the stationary frame 55 along the optical axis. A guide and support shaft 63 has its one end secured to the rear wall of the stationary frame 55 toward the bottom and extends parallel to the feed screw 61. The other end of the shaft 63 extends into a lead opening 54c formed in the zooming frame 54 adjacent to the female threaded bore 54b. A support shaft 67 has its one end secured to the stationary frame 55 at the left, top corner and its [oher] *other* end is fitted into an anti-rotation groove 54a formed in a block mounted on top of the zooming frame 54 toward its left side. In this manner, a translation of the zooming frame 54 with respect to the stationary frame 55 can take place without any oscillation.

The carrier frame 53 which carries another zoom lens group $L_2$ and is disposed within the zooming frame 54 comprises a hollow cylindrical body of a reduced length, which is provided with an anti-rotation groove 53b around its outer periphery at a right, upper portion and is also provided with a guide opening 53a which is also formed around the outer periphery at a left, lower portion or at a symmetrical position with respect to the groove 53b. Guide shafts 65, 64, which also serve as rotational stops, are [fixed]*fixedly* mounted on the zooming frame 54 and extend in parallel relationship with the optical axis and are closely fitted in the groove 53b and the opening 53a, thus locking the carrier frame 53 against rotation and preventing its oscillation during its translation in the direction of the optical axis.

The means which derives a rotational drive in [associated] *association* with the translation of the zooming frame 54 in the direction of the optical axis is constructed to derive a rotational drive by its operation in a plane parallel to the optical axis. It comprises a rack 60 disposed on the bottom wall of the stationary frame 55 at its left corner and extending parallel to the optical axis and a sector gear 59 rotatably mounted on the underside of the bottom of the zooming frame 54 for meshing engagement with the rack 60. The sector gear 59 has a support shaft 58a which extends into the zooming frame 54 by passing through the bottom wall thereof, with a pinion gear 58 integrally mounted on the top end thereof. The gear 58 is disposed in meshing engagement with a cam drive gear 57 which comprises a sector gear.

Figure 8:
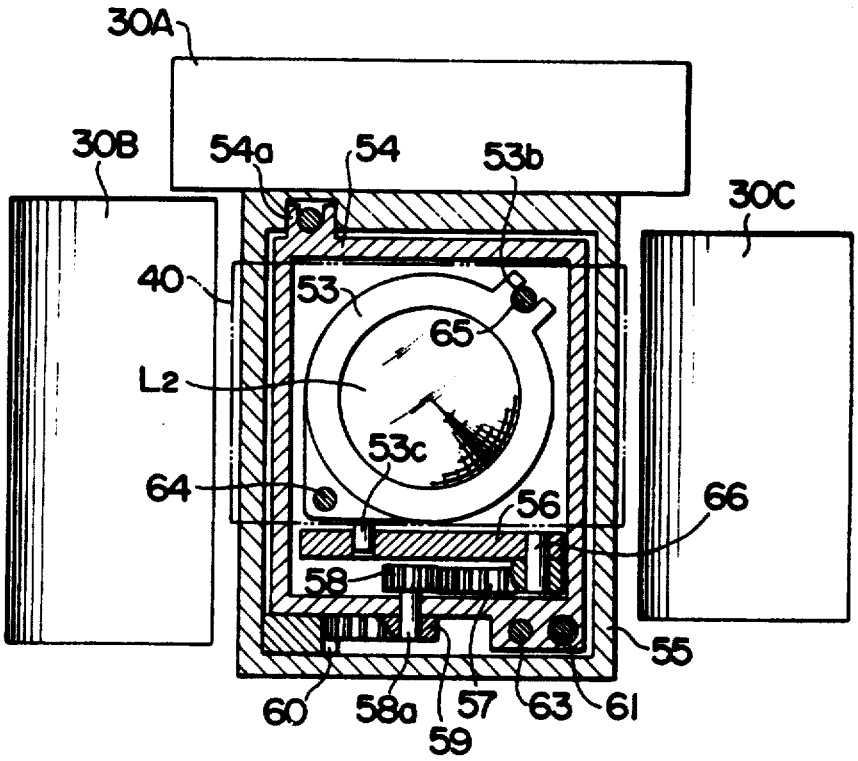
FIG. 8 is a rear view, partly in section, of part of the zooming mechanism shown in FIG. 7 as assembled into a camera.

The actuator cam 56 comprises a cam arm having a profiled slot therein, with its one end rotatably mounted on a support shaft 66 which is fixedly mounted on the bottom wall of the zooming frame 54 in an integral manner with the cam drive gear 57 which meshes with the gear 58 as indicated in FIG. 8. The actuator cam 56 is urged [of] *into* clockwise rotation by a torsion spring 62 and having its central portion disposed around the shaft 66 *and having its* one end anchored to a stationary point and having its [its] other end engaged with the lateral side of the cam 56. Adjacent to its free end, the actuator cam 56 is formed with a profiled slot 56a which is configured as a part of an arc, in which is fitted a drive pin 53c fixedly mounted on the carrier frame 53 on its bottom surface toward the left side thereof.

Figure 9:
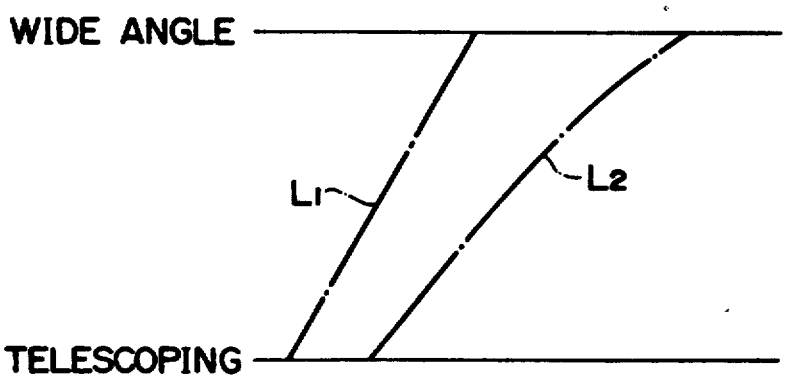
FIG. 9 diagrammatically illustrates the loci of movement of a focus lens group and another lens group used in the zooming mechanism shown in FIG. 7.
Figure 10A:
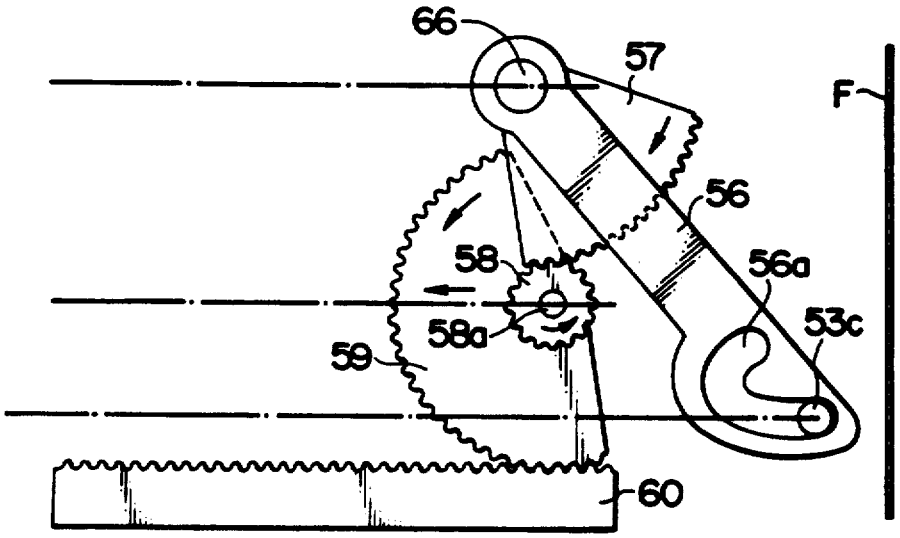
FIGS. 10A and 10B are plan views, to an enlarged scale, of part of a lens drive mechanism used in the zooming mechanism shown in FIG. 7, illustrating the manner of operation thereof.
Figure 10B:
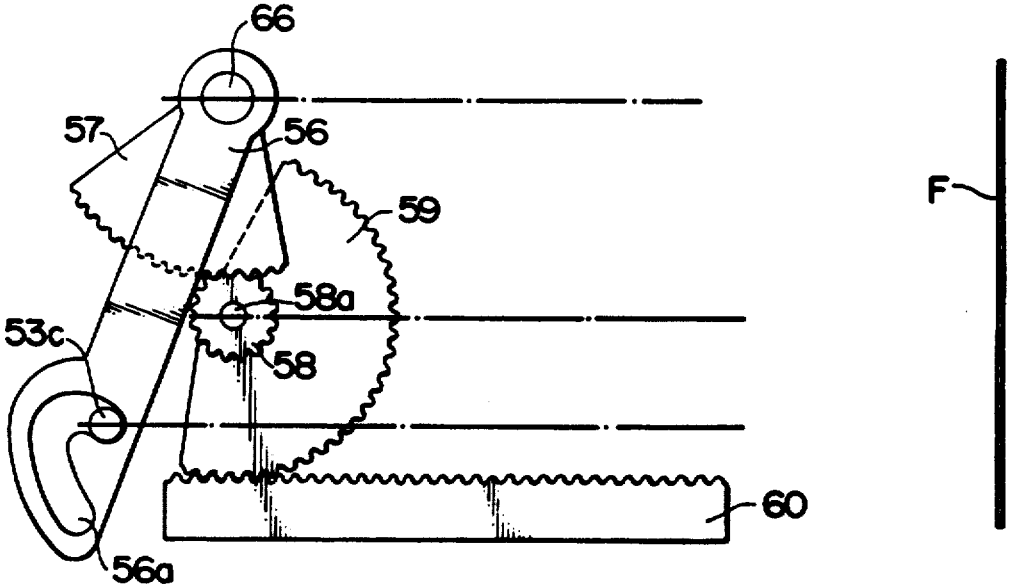

The operation of the zooming mechanism 51 when driving from the wide angle to the telescoping side will now be described with reference to FIGS. 7, 10A and 10B. When the feed screw 61 is turned by a drive source, not shown, (which may be an electric motor or a manual drive or the like), its engagement with the female threaded bore 54b drives the zooming frame 54 in the forward direction with respect to the stationary frame 55, thus advancing the focus lens group $L_1$. This movement causes the sector gear 59 which meshes with the rack 60 to rotate counter-clockwise, whereby the pinion gear 58 which is integrally mounted on the shaft 58a rotates in the same direction, causing the cam drive gear 57 which meshes therewith to rotate clockwise thereupon. Thereupon, the actuator cam 56 which is integral with the cam drive gear 57 rotates in the same direction, changing from its condition illustrated in FIG. 10A to a condition shown in FIG. 10B. Such rotation of the actuator cam 56 is effective to cause the guide pin 53c on the carrier frame 53 which is fitted into the profiled slot 56a in the actuator cam 56 to move therealong, thus causing the other zoom lens group $L_2$ to advance forward at the same time as the focus lens group $L_1$ moves in accordance with the optical design, achieving a zooming operation as illustrated in FIG. 9. When changing from the telescoping to the wide angle side, the operation occurs in an opposite manner. A reference character F shown in [FIG.] *FIGS.* 10A and 10B indicates a photographic film.

FIG. 8 shows the zooming frame 51 assembled into a camera, as viewed from the rear side thereof. It will be apparent by comparison of this FIG. with the conventional zooming mechanism employing a cam sleeve or the like as illustrated in FIGS. 13A, 13B to 15, there is no extension of the frame which projects beyond the picture frame 40, allowing the viewfinder 30A, the patrone chamber 30B and the spool chamber 30C to be disposed very close to the picture frame 40, allowing a substantial reduction in the overall size of the camera while simultaneously avoiding a troublesome meshing operation of forming a cam slot in a cam sleeve to thereby permit a substantial reduction in the manufacturing cost. It is to be understood that a mechanism which drives the zooming frame 54 is not limited to a feed screw mechanism, but any other drive mechanism such as a helicoidal screw may also be used. In addition, the invention is equally applicable to a zoom lens having three or four lens groups.

Figure 11A:
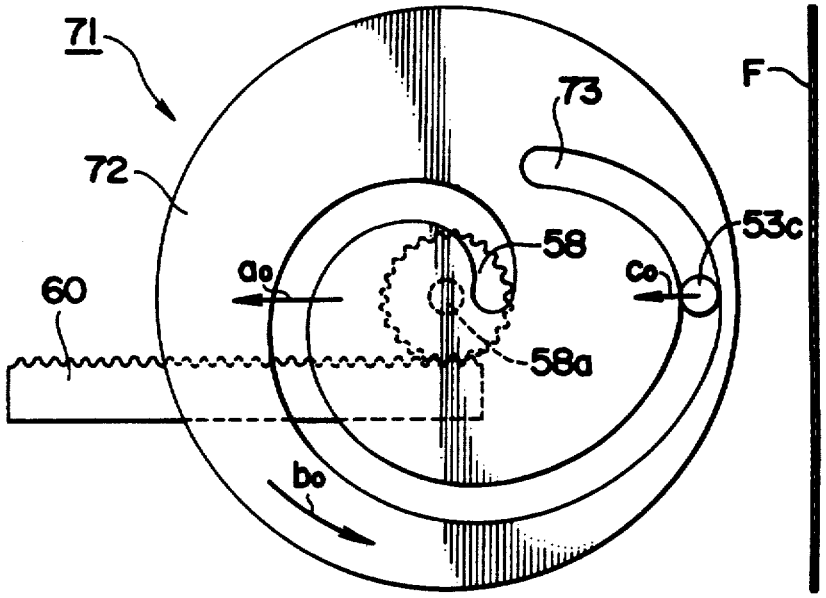
FIGS. 11A and 11B are plan views, to an enlarged scale, of another form of a drive mechanism for a carrier frame which carries another zoom lens group used in the zooming mechanism of the invention.
Figure 11B:
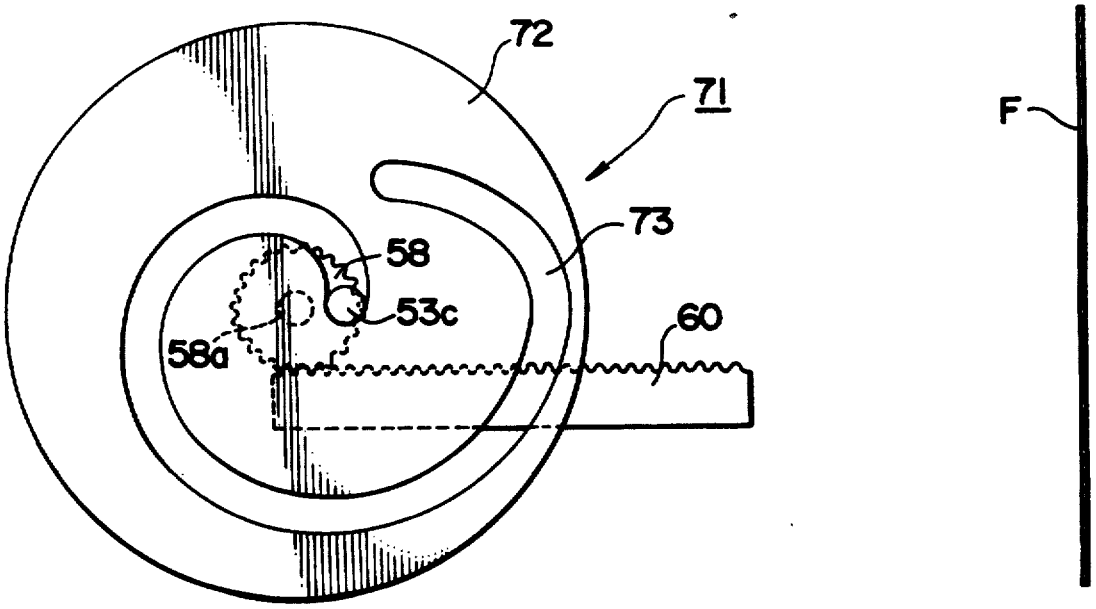

FIGS. 11A and 11B show another form of drive mechanism which causes a translation of a carrier frame carrying another lens group which may be used in the second embodiment. Specifically, a drive mechanism 71 comprises a single disc-shaped cam plate 72 which serves the combination of the actuator cam 56 and the cam drive gear 57, and a pinion gear 58 which is integral with the cam plate and which meshes with the rack 60. In other respects, the arrangement is similar to the previous drive mechanism. The cam plate 72 is formed with a spirally extending profiled slot 73 which extends from a point close to the center substantially through one revolution, with a guide pin 53c on the carrier frame 53 (see FIG. 7) being fitted into the profiled slot 73.

The drive mechanism 71 is also effective to achieve a smooth operation of the carrier frame 53 in a manner similar to the zooming frame 51 shown in FIG. 7. Specifically, when the feed screw 61 associated with the stationary frame 55 (see FIG. 7) is driven to cause the zooming frame 54 to advance forward, the engagement between the rack 60 and the pinion gear 58 is effective to move the cam plate 72 in a direction indicated by an arrow $a_o$ while causing the rotation indicated by an arrow $b_o$, as shown in FIG. 11A. Accordingly, the guide pin 53c which fits in the slot 73 moves in a direction indicated by an arrow $c_o$. As a result of a forward movement of the zooming frame 54, the cam plate 72 turns from a position illustrated in FIG. 11A to a position illustrated in FIG. 11B while causing the guide pin 53c to move forward, thus advancing the carrier frame 53. In this manner, both lens groups can be advanced through given strokes as with the zooming frame 51 shown in FIG. 7 from the wide angle to the telescoping side. When zooming in the opposite direction, the operation takes place in an opposite procedure.

Figure 12:
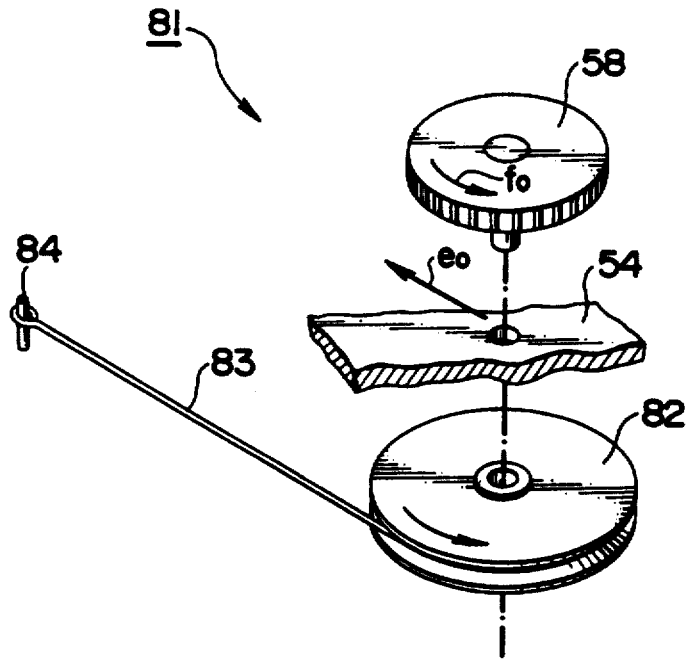
FIG. 12 is an exploded, perspective view of part of a further form of the drive mechanism similar to that shown in FIGS. 11A and 11B.
Figure 13A:
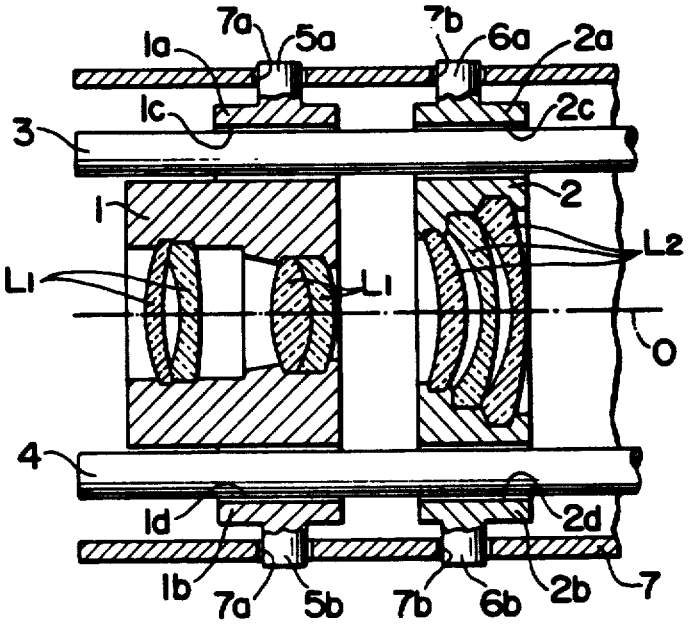
FIG. 13A PRIOR ART
FIGS. 13A and 13B are cross sections of one form of a conventional zooming mechanism for a zoom lens.
Figure 13B:
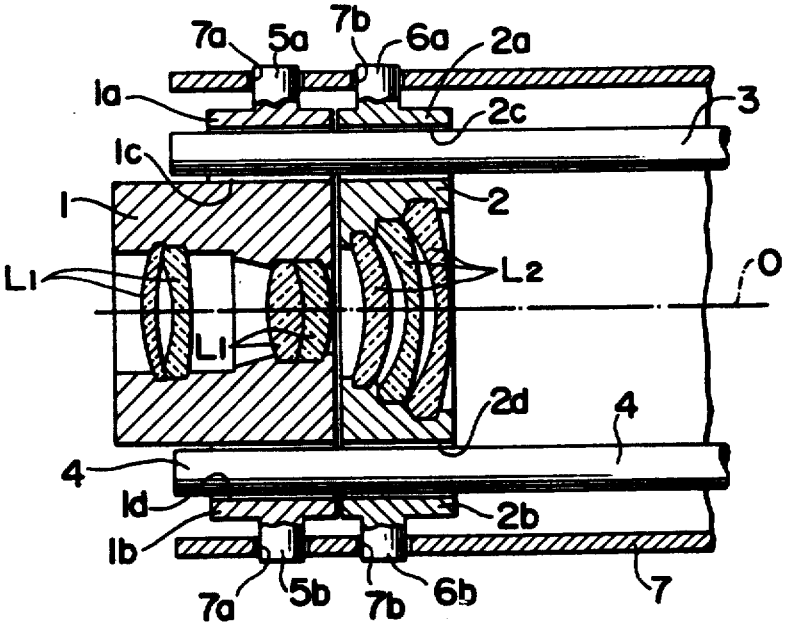
FIG. 13B PRIOR ART
Figure 14:
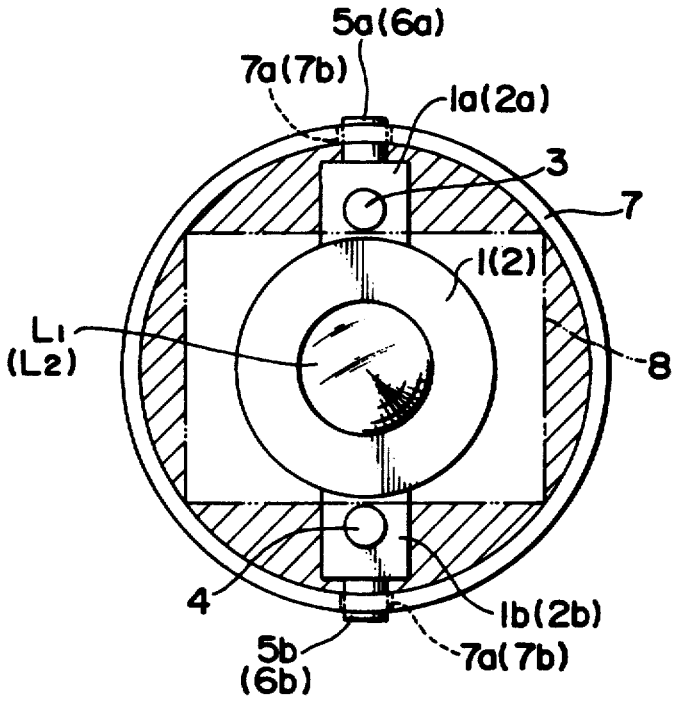
FIG. 14 PRIOR ART
FIG. 14 is a front view of the zooming mechanism shown in FIGS. 13A and 13B.
Figure 15:
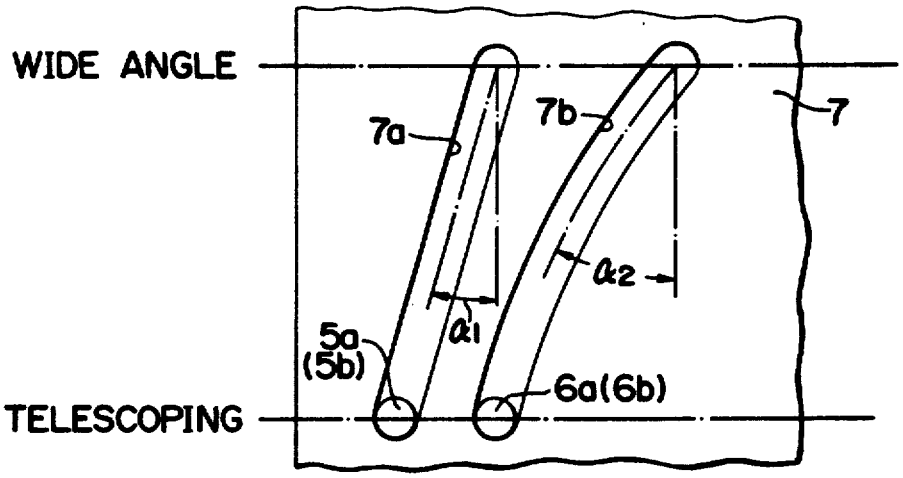
FIG. 15 PRIOR ART
FIG. 15 is a developed view of cam slots used in the zooming mechanism shown in FIGS. 13A and 13B.

FIG. 12 shows a further form of drive mechanism which causes translation of the carrier frame for another zoom lens which may be used in the second embodiment. Specifically, a drive mechanism 81 comprises a pulley 82 which is rotatable in an integral manner with the pinion gear 58, and a cord 83 having its one end anchored to the pulley 82 and its other end looped around a pin 84 which is fixedly mounted on a stationary member, the both of which are substituted for a combination of the sector gear 59 and the rack 60 shown in FIG. 7. The pulley 82 is rotatably mounted in coaxial relationship and integral with the gear 58 at the location where the sector gear 59 is disposed in the arrangement of FIG.7. In other respects, the zooming mechanism is constructed in the same manner as shown in FIG. 7.

The drive mechanism 81 operates as follows: Since the gear 58 is urged for counter-clockwise rotation (indicated by an arrow $f_o$) by the torsion spring 62 (see FIG. 7), it will be seen that as the zooming frame 54 translates in a direction indicated by an arrow $e_o$, the pulley 82 rotates in the same direction or counter clockwise, causing the gear 58 to rotate the cam drive gear 57 (see FIG. 7) and its integral actuator cam 56 clockwise, thus driving the carrier frame which carries another zoom lens group entirely in the same manner as the zooming mechanism 51 shown in FIG. 7. When the zooming frame 54 is translated in the opposite direction, the pulley 82 and the gear 58 rotate in the opposite direction, again operating in the same manner as the zooming mechanism 51 with [the] *a* similar effect. In the drive mechanism 81, the replacement of the rack 60 by the cord 83 simplifies the construction, requires less space requirement and allows a substantial reduction in the manufacturing cost.

What is claimed is:

1. A zooming mechanism for a zoom lens including a plurality of lens groups, comprising: .

a zooming frame movable in a direction of an optical axis with respect to a stationary member and carrying at least one lens group;

drive means for moving the zooming frame in the direction of the optical axis;

a carrier frame carrying another zoom lens group and supported by a support member within the zooming frame for movement back and forth in the direction of the optical axis;

means for deriving a rotational drive responsive to the movement of the zooming frame in the direction of the optical axis;

and means responsive to said *means* for deriving a rotational drive [means] to cause a non-linear movement of the carrier frame.

2. A zooming mechanism according to claim 1, in which the zooming frame comprises a hollow body and is slidably fitted in the stationary member which also comprises a hollow body of a greater size, the zooming frame being disposed for movement back and forth in the direction of the optical axis while utilizing a support shaft disposed within the stationary member in parallel relationship with the optical axis as a guide.

3. A zooming mechanism according to claim 2, wherein said zooming frame hollow body and said stationary member hollow body are substantially rectangular.

4. A zooming mechanism according to claim 3, further including a rectangular film frame arranged adjacent to said zooming mechanism;

said zooming frame hollow rectangular-shaped body being slightly greater in size than said film frame.

5. A zooming mechanism according to claim 4, wherein three sides of said zooming frame hollow rectangular-shaped body are substantially equal in length to three associated sides of said rectangular film frame.

6. A zooming mechanism according to claim 1, in which the drive means comprises a feed screw disposed within the stationary member and extending in a direction parallel to the optical axis, a female threaded bore formed in a block secured to a lower surface of the zooming frame for threadable engagement with the feed screw, and a rotation transmitting gear secured to the feed screw for transmitting a rotational drive to the feed screw.

7. A zooming mechanism according to claim 1, in which the carrier frame comprises a hollow cylindrical member of a reduced length in which a zoom lens is carried, the carrier frame being provided with guide openings at symmetrical positions around its outer periphery with respect to each other through which guide members disposed within the zooming frame extend and which also serve as rotational stops.

8. A zooming mechanism according to claim 1, in which said means for deriving a rotational drive comprises a first non-circular gear which is coaxially and integrally mounted on a support shaft extending through the zooming frame for a pinion rotatably mounted on a lower surface of the zooming frame and meshing with a rack which is disposed within the stationary member and extending in the direction of the optical axis.

9. A zooming mechanism according to claim 8, in which the first non-circular gear comprises a spur gear in the configuration of part of a spiral having a radial distance from a pivot located at a predetermined pivot mounting location which progressively increases in the circumferential direction.

10. A zooming mechanism according to claim 1, in which the responsive means for moving the carrier frame comprises a second non-circular gear rotatably mounted within the zooming frame and disposed in meshing engagement with a first non-circular gear of said means for deriving a rotational drive, an elongate slot formed in the second non-circular gear, and a drive pin fixedly mounted on the carrier frame and fitted into the elongate slot, the rotation of the second non-circular gear causing a displacement of the elongate slot, whereby the drive pin is effective to move the carrier frame.

11. A zooming mechanism according to claim 10, in which the second non-circular gear comprises a sector gear having a radial distance from its pivot located at a predetermined pivot mounting location which gradually changes in the circumferential direction.

12. A zooming mechanism according to claim 1, in which said means for deriving a rotational drive comprises a first non-circular gear coaxially and integrally mounted on support shaft for a pulley which is rotatably mounted on a lower surface of the zooming frame, the pulley having one end of a cord anchored thereto which has its other end secured to the stationary member, the pulley being urged for angular movement to return to its original position.

13. A zooming mechanism according to claim 1, in which said responsive means for moving the carrier frame comprises a second non-circular gear rotatably mounted within the zooming frame and disposed in meshing engagement with a first non-circular gear of said means for deriving a rotational drive, a drive pin fixedly mounted on the second noncircular gear, and an elongate slot formed in the carrier frame and in which the drive pin is fitted, the rotation of the second non-circular gear causing a displacement of the drive pin which is effective through the elongate slot to move the carrier frame.

14. A zooming mechanism according to claim 1 in which said means for deriving a rotational drive comprises a pinion gear rotatably mounted on a lower surface of the zooming frame and coaxially and integrally mounted on a support shaft for a sector gear, which meshes with a rack disposed within the stationary member and extending in a direction parallel to the optical axis, which extends into the zooming frame.

15. A zooming mechanism according to claim 1, in which said responsive means for moving the carrier frame comprises a cam drive gear rotatably mounted within the zooming frame and disposed in meshing engagement with a pinion gear of said means for deriving a rotational drive, a cam arm having its one end coaxially and integrally mounted on a support shaft for the cam drive gear, an actuator cam formed by a profiled cam formed in the cam arm, and a drive pin fixedly mounted on the carrier frame and fitted into the actuator cam, the rotation of the pinion gear being effective to cause a rotation of the cam arm to move the carrier frame through the engagement between the actuator cam and the drive pin.

16. A zooming mechanism according to claim 15, in which the cam drive gear comprises a sector gear.

17. A zooming mechanism according to claim 1, in which said means for moving the carrier frame comprises a cam disc rotatably mounted within the zooming frame and integrally mounted on a support shaft for a pinion gear of said means for deriving a rotational drive and having an actuator cam, formed by a profiled slot, extending in the manner of a spiral over at least a portion of one revolution, and a drive pin fixedly mounted on the carrier frame and fitted into the actuator cam, the rotation of the cam disc resulting from the rotation of the pinion gear being effective to cause the carrier frame to be moved through the engagement between the actuator cam and the drive pin.

18. A zooming mechanism according to claim 1, in which said means for deriving a rotational drive comprises a pinion gear rotatably mounted within the zooming frame, a pulley secured to an end of a support shaft for the pinion gear which extends below the zooming frame and urged to return to its original position, and a cord having its one end anchored to the pulley and other end secured to the stationary member.

19. A zooming mechanism according to claim 1, in which a focus lens group is displaceably supported by the zooming frame for translation back and forth along the optical axis.

20. A zooming mechanism according to claim 1, in which said means for deriving a rotational drive includes rotatable means journalled on said zooming frame.

21. A zooming mechanism according to claim 1, in which said means for deriving a rotational drive is rotatable about an axis which is transverse to said optical axis.

22. A zooming mechanism for a zoom lens including a plurality of lens groups, comprising:

a zooming frame linearly movable in the direction of an optical axis and carrying at least one lens group;

drive means for moving said zooming frame;

a carrier frame slidably disposed within said zooming frame and carrying another lens [groups] *group*; and means responsive to linear movement of said zooming frame for moving said carrier frame in a non-linear manner.

23. A zooming mechanism according to claim 22, [wheein] *wherein* the responsive means for moving said carrier frame comprises means for providing a rotational output responsive to said linear movement of the zooming frame and means responsive to the rotational output for moving the carrier frame in a non-linear manner.

24. A zooming mechanism according to claim 23, wherein the means for providing a rotational output responsive to linear movement of the zooming frame comprises a rack and cooperating pinion having a pinion shaft for providing said rotational output.

25. A zooming mechanism to claim 23, wherein said means for providing a rotational output responsive to linear movement of the zooming frame comprises a pulley secured to a shaft rotatably mounted on said zooming frame coupled between a stationary location and the periphery of said pulley for rotating said pulley and said shaft responsive to linear movement of the zooming frame.

26. A zooming mechanism according to claim 23, in which the means responsive to the rotational output for moving the carrier frame in a non-linear manner comprises a cam disk having cam means for imparting non-linear movement to said carrier frame responsive to rotation of said cam disk by said rotational output.

27. The zooming mechanism according to claim 23, wherein said means responsive to the rotational output for moving the carrier frame in a non-linear manner comprises first and second meshing gears, said first meshing gear being rotated by said rotational output and said second meshing gear being rotated by said first meshing gear and including means for imparting non-linear movement to said carrier frame.

28. A zooming mechanism according to claim 27, wherein said means responsive to the rotational output for moving the carrier frame in a non-linear manner comprises a cam lever rotated by said second gear and having cam means for imparting non-linear movement to said carrier frame.

29. A zooming mechanism according to claim 27, wherein said second gear is a non-circular gear; and said mechanism further comprising means for moving said carrier frame, said carrier frame being responsive to rotation of said second gear.

30. A zooming mechanism for a zoom lens, comprising;

a zooming frame provided on a zoom lens having a plurality of lens groups, said frame being movable back and forth in the direction of an optical axis with respect to a stationary member and carrying at least one lens group in such a manner that the lens group is movable back and forth in the direction of said optical axis;

drive means for moving said zooming frame in the direction of said optical axis;

a carrier frame movably disposed within said zoom frame by a support member provided in the zooming frame, said carrier frame being movable back and forth in the direction of said optical axis and carrying another lens group;

means for deriving a rotational drive responsive to the movement of the zooming frame in the direction of said optical axis, said means being rotatably supported on said zooming frame; and means rotatably supported on said zooming frame, which is rotated by said rotational drive for moving said carrier frame in a non-linear manner.

31. A zooming mechanism according to claim 30, in which the drive means comprises a feed screw disposed within the stationary member and extending in a direction parallel to the optical axis, a female threaded bore formed in a block secured to the lower surface of the zooming frame for threadable engagement with the feed screw, and a rotation transmitting gear secured to the feed screw for transmitting a rotational drive to the feed screw.

32. A zooming mechanism according to claim 30, in which said means for deriving a rotational drive comprises a first non-circular gear which is coaxially and integrally mounted on a support shaft extending through the zooming frame for a pinion rotatably mounted on a lower surface of the zooming frame and meshing with a rack which is disposed within the stationary member and extending in the direction of the optical axis.

33. A zooming mechanism according to claim 32, in which the first non-circular gear comprises a spur gear in the configuration of part of a spiral having a radial distance from a pivot located at a predetermined pivot mounting location which progressively increases in the circumferential direction.

34. A zooming mechanism according to claim 30, in which the means for moving the carrier frame comprises a second non-circular gear rotatably mounted within the zooming frame and disposed in meshing engagement with a first non-circular gear of said means for deriving a rotational drive, an elongate slot formed in the second non-circular gear, and a drive pin fixedly mounted on the carrier frame and fitted into the elongate slot, the rotation of the second non-circular gear causing a displacement of the elongated slot, whereby the drive pin is effective to move the carrier frame.

35. A zooming mechanism according to claim 34, in which the second non-circular gear comprises a sector gear having a radial distance from its pivot located at a predetermined pivot mounting location which gradually changes in the circumferential direction.

36. A zooming mechanism according to claim 30, in which said means for moving the carrier frame comprises a cam drive gear rotatably mounted within the zooming frame and disposed in meshing engagement with a pinion gear of said means for deriving a rotational drive, a can arm having its one end coaxially and integrally mounted on a support shaft for the cam drive gear, an actuator cam formed by a profiled cam formed in the cam arm, and a drive pin fixedly mounted on the carrier frame and fitted into the actuator cam, the rotation of the pinion gear being effective to cause a rotation of the cam arm to move the carrier frame through the engagement between the actuator cam and the drive pin.

37. A zooming mechanism for a zoom lens as defined in claim 30, in which said zooming frame is linearly moved in the direction of said optical axis by said drive means.

38. A zooming mechanism according to claim 30, in which said means for deriving a rotational drive is rotatable about an axis which is transverse to said optical axis.

39. A zooming mechanism according to claim 30, in which said means for deriving a rotational drive includes rotatable means journalled on said zooming frame.

*40. A zooming system of a zoom lens composed of a plurality of lens groups having a common optical axis comprising:*

*a zooming frame supporting at least one lens group and movable in back-and-forth directions of the optical axis;*

*driving means for selectively moving said zooming frame in one of said back-and-forth directions;*

*a carrier frame supporting another zoom lens group being movably supported for back-and-forth movement along said optical axis;*

*intermediate driving means responsive to movement of said zooming frame for providing a rotational output; and*

*means for moving said carrier frame in a non-linear manner responsive to the rotational output of said intermediate driving means.*

*41. A zooming system of a zoom lens according to claim 40 wherein said intermediate driving means rotates about an axis perpendicular to said optical axis.*

* * * * *

UNITED STATES PATENT AND TRADEMARK OFFICE

CERTIFICATE OF CORRECTION

PATENT NO. : RE 34,059

DATED : September 8, 1992

INVENTOR(S) : Akitake

It is certified that error appears in the above-identified patent and that said Letters Patent is hereby corrected as shown below:

Column 14, line 6, change "can" to --cam--

Signed and Sealed this

Twenty-eighth Day of September, 1993

Bruce Lehman

*Attest:*

BRUCE LEHMAN

*Attesting Officer*

*Commissioner of Patents and Trademarks*